(No Model.) 6 Sheets—Sheet 1.
F. A. SCHLEIFF, F. A. SCHLEIFF, Jr. & P. EHMKE.
CIGAR BUNCHING MACHINE.
No. 439,978. Patented Nov. 4, 1890.
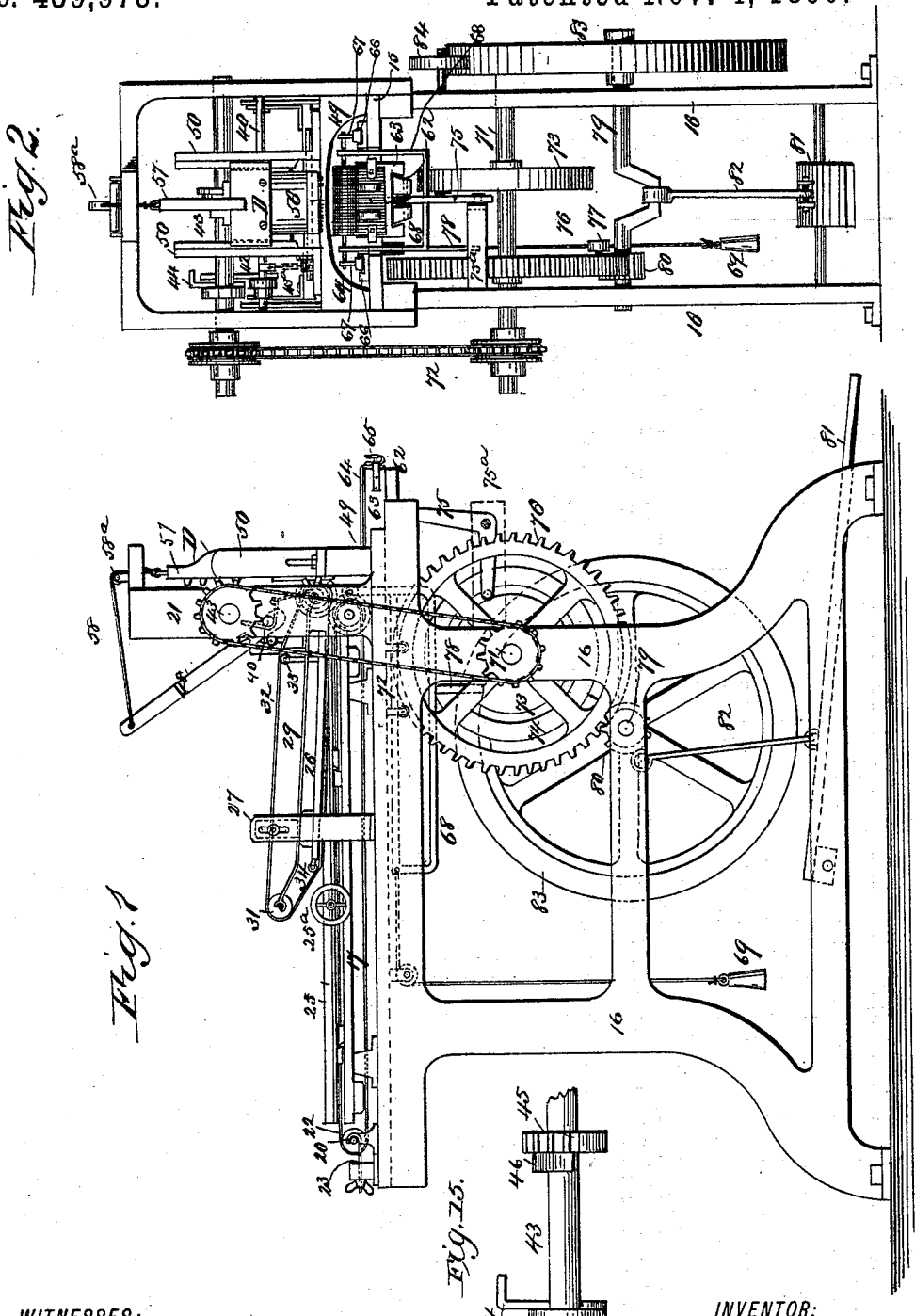
WITNESSES:
Francis McArdle.
C. Sedgwick
INVENTOR:
F. A. Schleiff
F. A. Schleiff Jr.
P. Ehmke
BY Munn & Co.
ATTORNEYS.

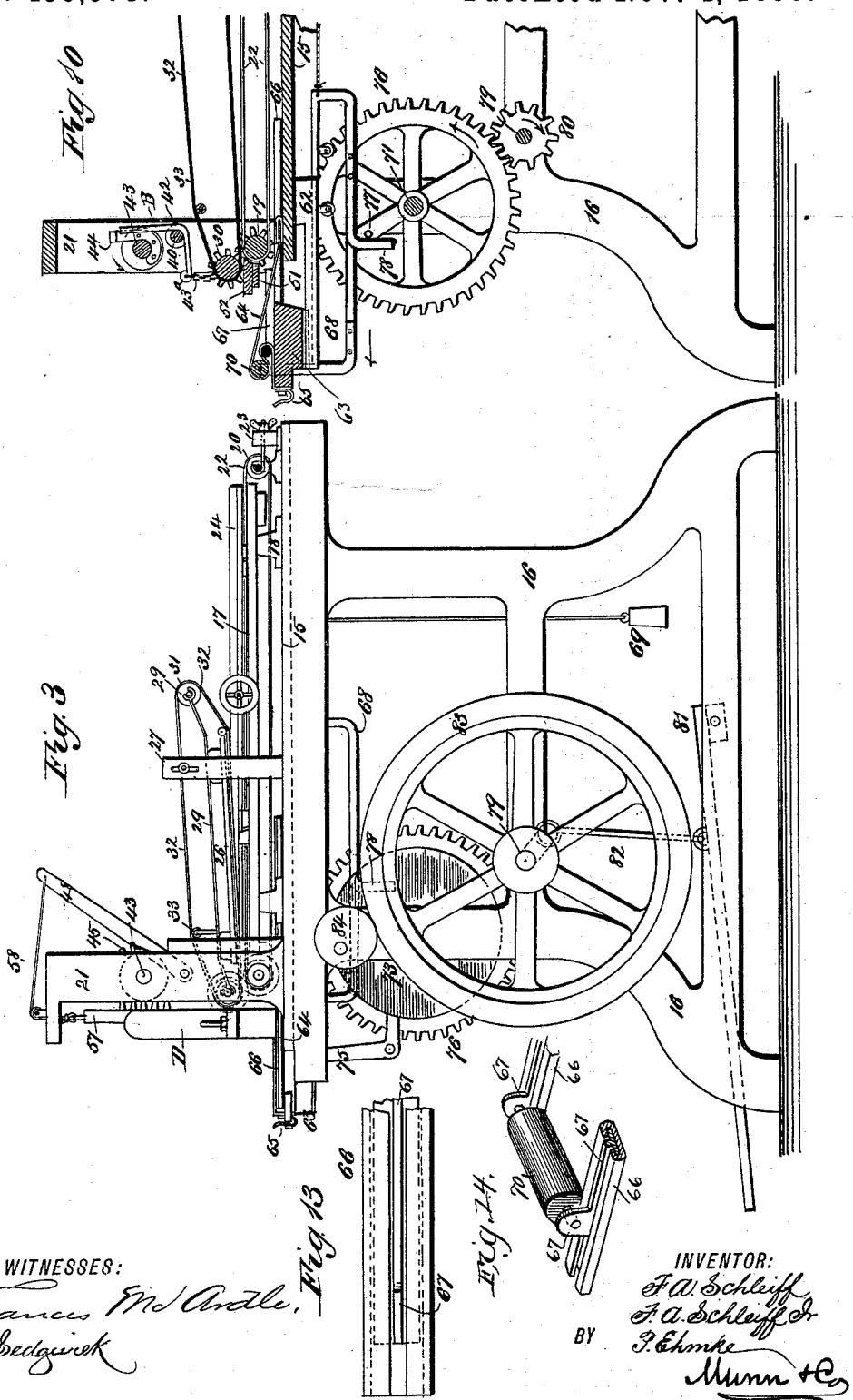

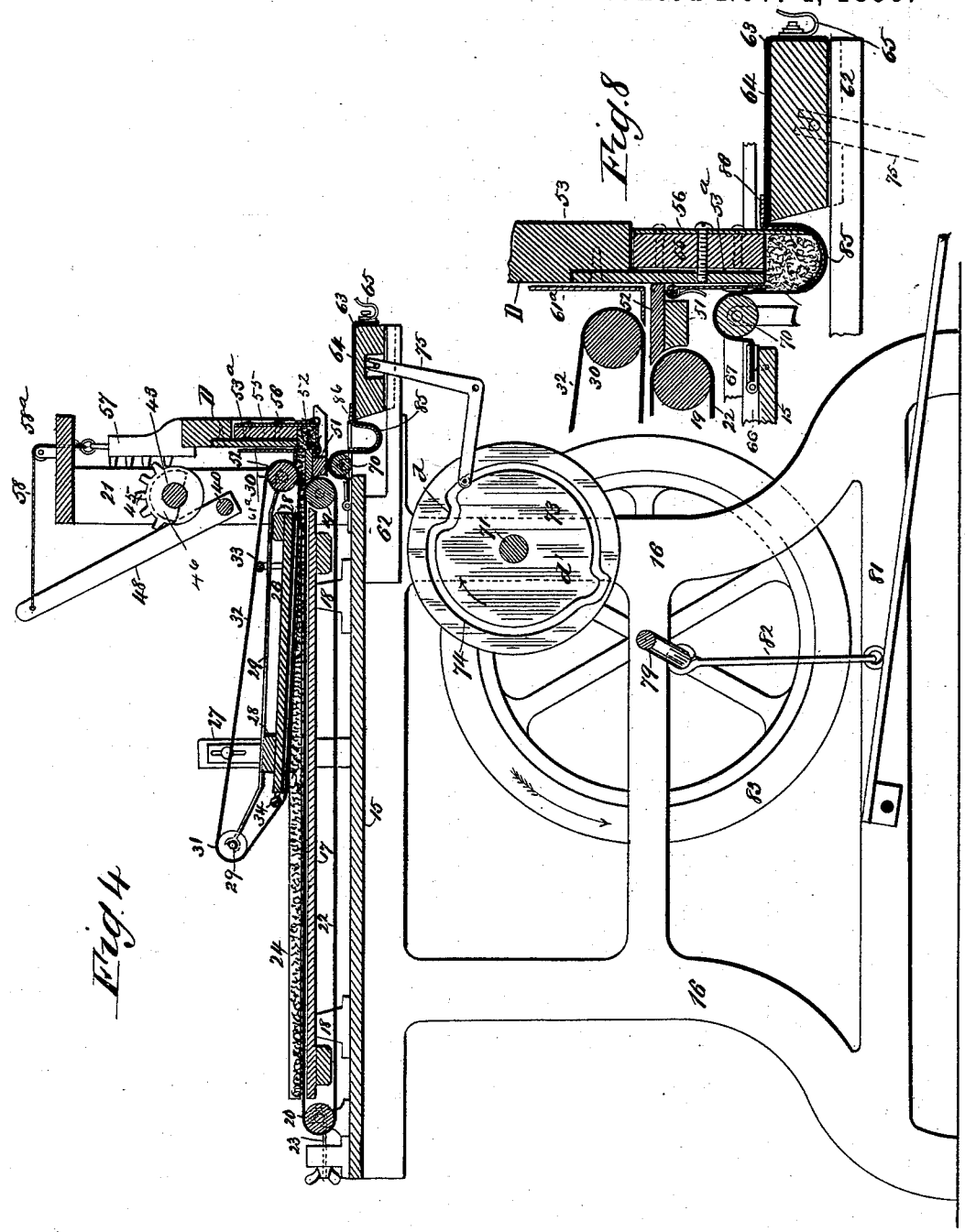

(No Model.) 6 Sheets—Sheet 4.
F. A. SCHLEIFF, F. A. SCHLEIFF, Jr. & P. EHMKE.
CIGAR BUNCHING MACHINE.
No. 439,978. Patented Nov. 4, 1890.
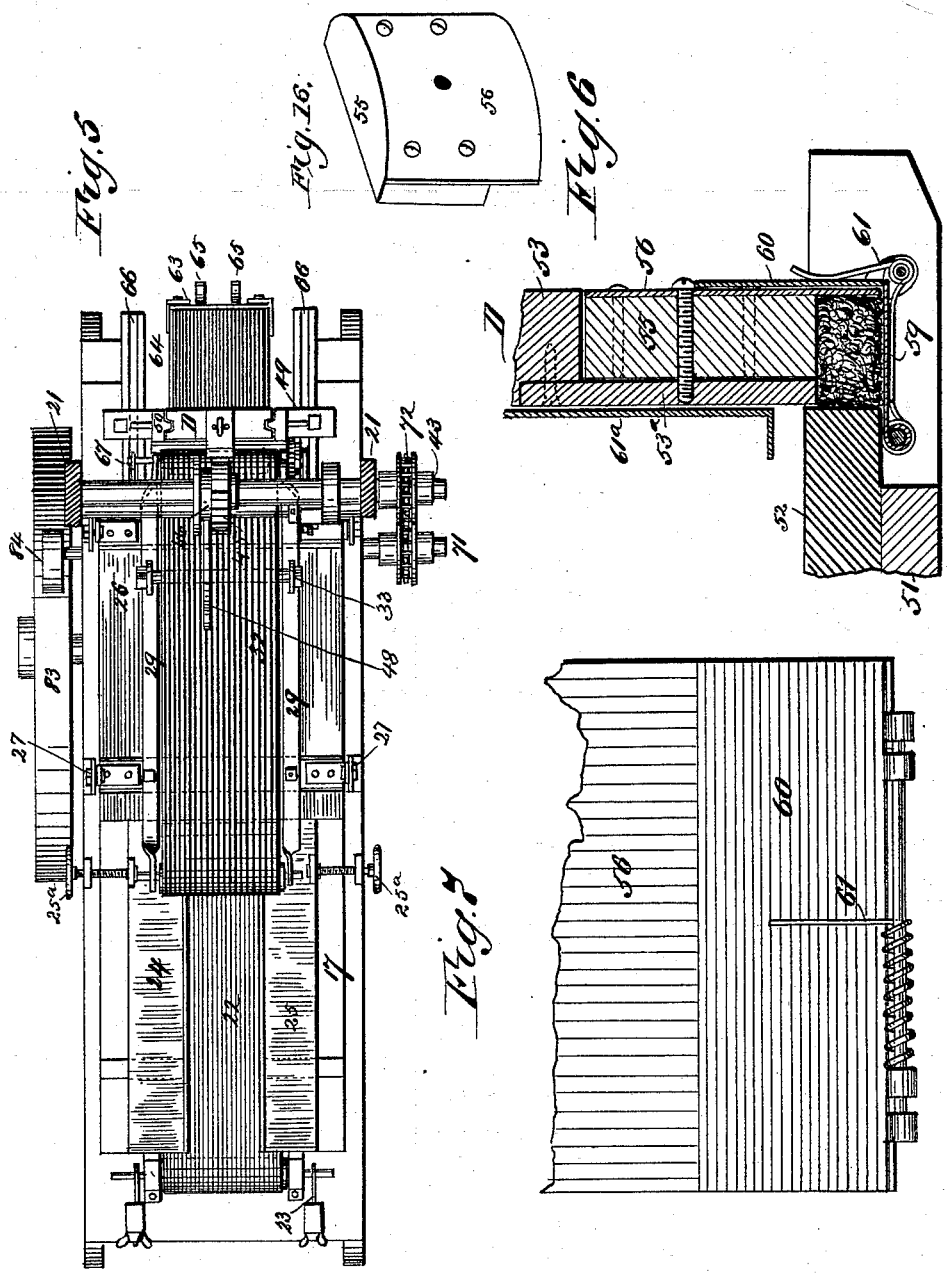
WITNESSES:
Francis McArdle
C. Sedgwick
INVENTOR:
F. A. Schleiff
F. A. Schleiff Jr
P. Ehmke
BY Munn & Co
ATTORNEYS.

(No Model.) 6 Sheets—Sheet 5.
F. A. SCHLEIFF, F. A. SCHLEIFF, Jr. & P. EHMKE.
CIGAR BUNCHING MACHINE.
No. 439,978. Patented Nov. 4, 1890.
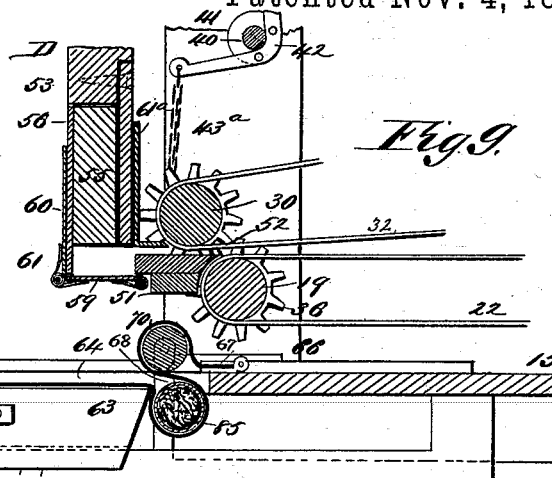
Fig. 9.
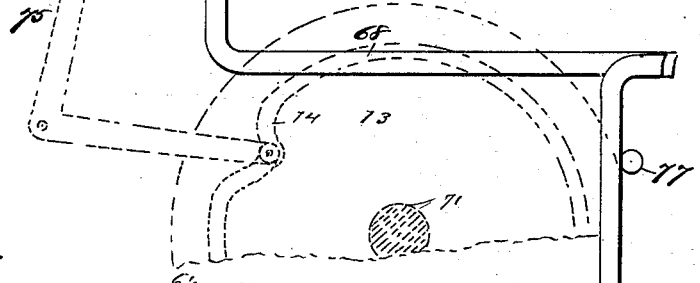
Fig. 11.
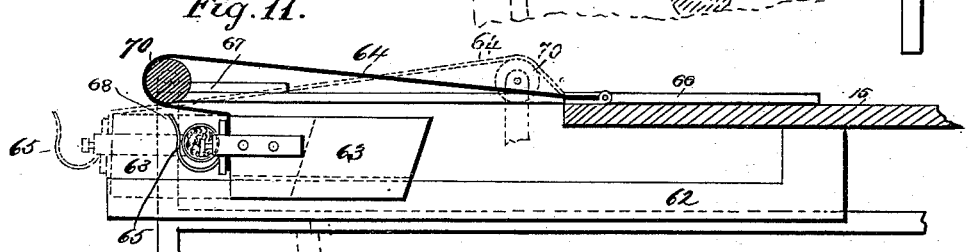
WITNESSES:
Francis McArdle
C. Sedgwick
INVENTOR:
F. A. Schleiff
F. A. Schleiff Jr
P. Ehmke
BY Munn & Co.
ATTORNEYS.

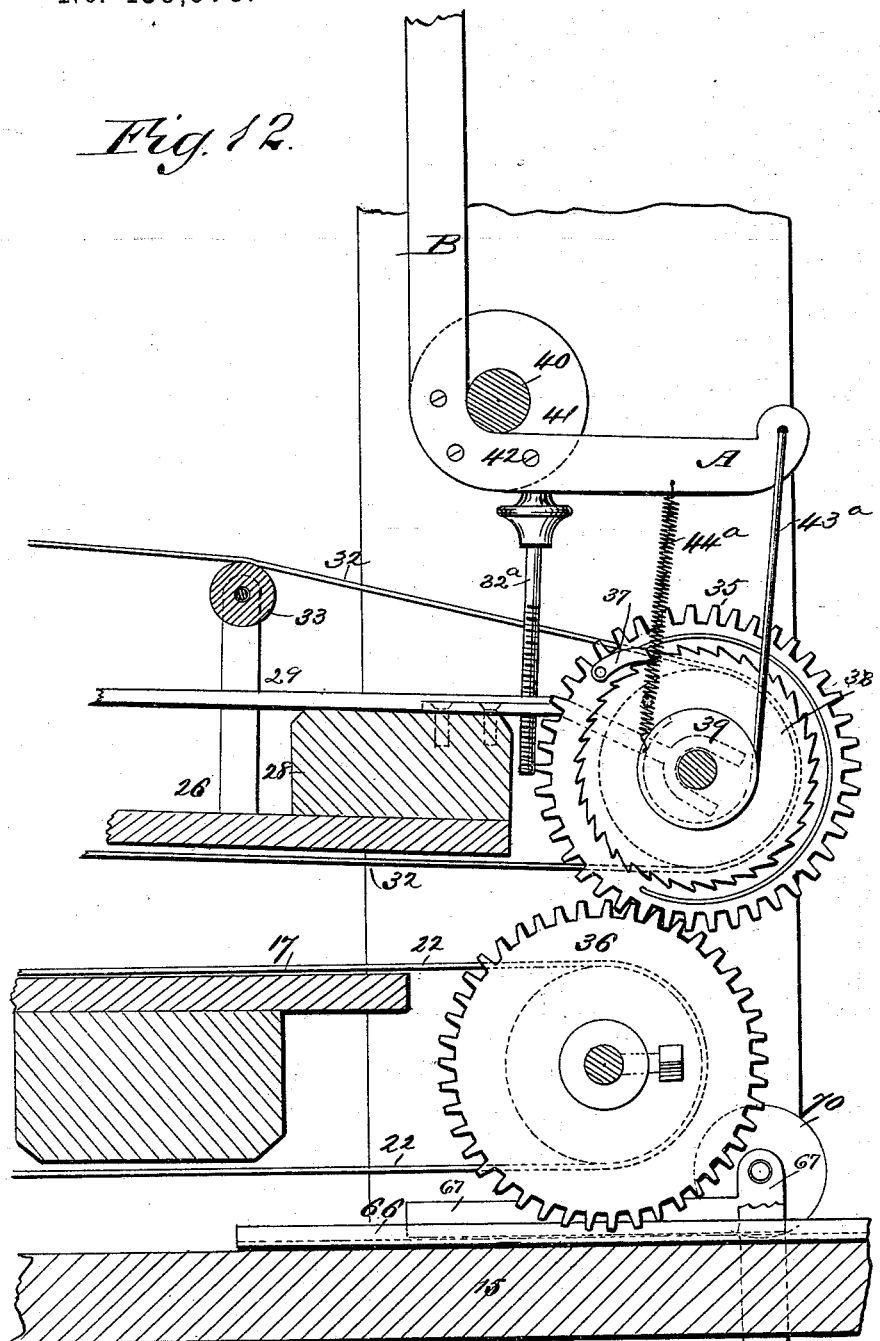

UNITED STATES PATENT OFFICE.

FRANCIS A. SCHLEIFF, FRANCIS A. SCHLEIFF, JR., AND PAUL EHMKE, OF NEW YORK, N. Y.

CIGAR-BUNCHING MACHINE.

SPECIFICATION forming part of Letters Patent No. 439,978, dated November 4, 1890.

Application filed June 8, 1889. Serial No. 313,558. (No model.)

*To all whom it may concern:*

Be it known that we, FRANCIS A. SCHLEIFF, FRANCIS A. SCHLEIFF, Jr., and PAUL EHMKE, all of New York city, in the county and State of New York, have invented a new and Improved Cigar-Bunching Machine, of which the following is a full, clear, and exact description.

Our invention relates to an improvement in cigar-bunching machines, and has for its object to provide a machine capable of automatically bunching the tobacco fed thereto, compress and roll the same in a binder, and deliver the completed article in condition to receive the wrapper.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is an elevation of one side of the machine. Fig. 2 is a front view, and Fig. 3 is an elevation, of the other side. Fig. 4 is a central vertical section through the machine. Fig. 5 is a plan view. Fig. 6 is a vertical sectional view through the forming-head, illustrating the same in the second position or just after having made a cut. Fig. 7 is a partial front elevation of the forming-head, enlarged, illustrating the position of the spring-actuated gates thereon when in the first position. Fig. 8 is a central vertical section through the forming-head, the rolling-table, and rolling and delivery apron, illustrating the head in third position or as depositing the bunch upon the apron. Fig. 9 is a central vertical section through the forming-head and a side elevation of the rolling-board, illustrating the head as returned to its normal or first position and the apron as contracting or compressing the bunch, this being the fourth position assumed by the machine, the cam and elbow-lever for operating the rolling-table being shown in dotted lines. Fig. 10 is a central vertical section through the front of the machine, illustrating the fifth position, showing the bunch being rolled in the binder and about to be delivered. Fig. 11 is a side elevation of the rolling-table and the rolling or delivery apron, illustrating in positive lines the position of the apron and bunching-roller 19 when the completed article is delivered and in dotted lines the position of the rolling-table and apron immediately after the article is delivered and prior to forming the open pocket in the apron shown in Fig. 1, the bunching-roller and a portion of the frame being in section and broken away, and the cam and elbow-lever for operating the rolling-table being shown in dotted lines. Fig. 12 is an enlarged sectional view of the feed mechanism. Fig. 13 is a partial plan view of one of the guides and standards in which the bunching-roller is journaled. Fig. 14 is a detail perspective view of the guides, standards, and bunching-roller. Fig. 15 is a detail view of the upper drive-shaft, its crank-arm, mutilated gear, and cam; and Fig. 16 is a perspective view of the former-block.

In carrying out the invention the bed 15 of the machine is flat and supported by suitable legs or standards 16, and upon the bed a table 17 is horizontally secured by means of interposed studs 18 or their equivalents, which table extends nearly the length of the bed.

At each end of the table 17 a roller 19 and 20 is respectively journaled, the forward roller being journaled in a yoke-frame 21, attached to the bed at the front, and the rear roller in bearings held to slide upon the bed. These two rollers are adapted to carry an endless apron 22, which passes over and beneath the table, as shown in Fig. 4, and the apron is stretched, preferably, by means of hooks 23 engaging with the trunnions of one of the rollers and having threaded shanks extending through offsets upon the bed, upon which shanks thumb-nuts are screwed.

The table 17 is provided with two laterally-adjustable guides 24 and 25—one attached to each side—which guides extend over the apron 22 out of contact therewith, reducing the exposed surface of the apron and providing a channel in which the loose tobacco to be manipulated is placed, as shown in Fig. 5. The adjustment of the guide is preferably effected by screw 25ᵃ, as shown in Fig. 5.

Above the table 17 a plate or board 26 is located, having a slight forward and downward inclination and extending from a point at or near the center of the table to the forward end or slightly beyond it, as shown in Fig. 4. This plate or board is adjustably supported in its inclined position by side standards 27, secured to the bed and brackets connecting the standards and plate or board.

Upon battens 28, attached to the plate 26, two metal arms 29 are fastened—one located near each longitudinal side edge, as shown in Fig. 5—which arms are bent downward and beyond the table at their forward extremities, as shown in Figs. 4 and 12, and upward and outward at their rear extremities, as shown in Fig. 4. In the forward and rear ends of the arms 29 rollers 30 and 31 are respectively journaled, the forward roller being slightly in advance of the corresponding lower apron-roller, and over the two rollers 30 and 31 an endless apron 32 is made to travel, which apron passes both above and below the plate 26, whereby it contacts with the tobacco carried forward by the lower apron and assists in the movement thereof. As the two aprons are out of parallelism, the tobacco, as it is carried forward, is gradually compressed. Anti-friction rollers 33 and 34 are made to contact with the inner surface of the upper apron above the plate 26 and the inner surface of the same at the rear of the said plate, as is likewise illustrated in Fig. 4.

The apron-rollers 19 and 30 are respectively provided with gears 35 and 36, meshing with each other. The gear 35 has pivoted thereon a spring-actuated dog 37, as shown in Fig. 12, adapted to engage with a ratchet-wheel 38, provided with a hub 39, which hub is loosely mounted upon the said upper roller 30.

In the yoke-frame 21 below the center a shaft 40 is journaled, upon which shaft an angled lever 42 is secured by means of its collar 41. The horizontal member A of said lever, which projects forwardly from the shaft, as shown in Fig. 12, is connected with the under forward face of the hub 39 by a link or chain 43ᵃ or equivalent device, and a spring 44ᵃ, of any approved material, is secured to the said member A and fastened at the other end to the hub 39 at or near the attachment of the link or chain 43ᵃ.

It will be observed that if the vertical member B of the angled lever is pressed inward and rearward the hub 39 is revolved by the link or chain 43ᵃ, and the ratchet bearing against the dog 37 will revolve the upper roller 30, which in turn will communicate motion to the lower roller 19. When the angled lever returns to its normal position, the spring in drawing it back will also revolve the ratchet and cause it to engage again with the dog. It will be further observed that according to the length of the throw of the angled lever more or less tobacco will be fed forward by the aprons 22 and 32. Therefore, in order to regulate the movement of the aprons, a set-screw 32ᵃ is passed through one of the arms 29, as shown in Fig. 12, the head of which is immediately beneath the horizontal member A of the angled lever. By raising the screw the feed is decreased and by lowering the screw a greater swing of the lever is permitted and the feed increased.

The angled lever 42 is acted upon at intervals by an upper drive-shaft 43, journaled in the yoke-frame 21, which shaft is provided with a rearwardly-extending crank-arm 44, attached thereto, preferably, by a collar, as shown in Figs. 2, 10, and 15. This crank-arm at a certain point in the revolution of the shaft engages the vertical member B of the angled lever 42 to move it, for the purpose hereinafter set forth.

At or near the center of the upper drive-shaft 43 a mutilated gear-wheel 45 is keyed or otherwise secured, and next thereto a segmental cam 46 is attached, as shown in Figs. 5 and 15 and dotted lines in Fig. 4. The cam is adapted to throw rearward a bar 48, secured upon the shaft 40, for the purpose hereinafter described.

Upon the forward portion of the bed a block 49 is secured, having secured to its upper face at each side of the center a standard 50, provided with a rib upon its inner face, the central under surface of the block being hollowed out or recessed, as illustrated in Fig. 2.

Upon the back of the arched block a transverse projection or extension 51 is produced, and upon said extension a knife 52 is rigidly secured, the upper face whereof is practically flush with the corresponding surface of the lower table 17, as shown in Fig. 4, and the cutting-edge of the knife is made to project over the upper forward edge of the block, as is also shown in Fig. 4.

A forming-head D is held to slide between the standards 50. This forming-head may be made in various ways, and is illustrated as comprising a body portion 53, having secured to its inner side a downwardly-extending cutting-blade 53ᵃ, adapted to pass in close contact with the fixed cutter or knife 52. To the outer face of the cutting-blade 53ᵃ or to the body portion 53, preferably the former, a former-block 55 is secured in any approved manner—as, for instance, by screws—which block extends downward flush with the lower edge of the cutting-blade, as shown clearly in Figs. 6 and 8. The former-block is provided with a curved outer face, and to said face is secured the former 56, consisting, preferably, of a piece of sheet metal conforming to the curved face of the block and extending a distance below the same, as shown in Figs. 6, 8, and 16. The block is made separate from the body portion 53, in order that it may be readily removed and another one of different shape may be substituted whenever it is desired to change the shape of the cigar.

To the upper part of the body portion 53 of the forming-head D, at or near the center, a toothed bar 57 is attached, the teeth of said bar being on its inner face and meshing with (shown in Fig. 8) they entirely uncover the bottom of the head and the tobacco is delivered into the pocket 85 of the apron upon the binder therein. At this time the cam 46, acting upon the lever 48, raises the head and the gates close over it. As the head ascends, one member of the elbow-lever 75 enters the irregular portion $d$ of the cam-groove 74, and the rolling-table is carried inward until its inner edge just passes beneath the bunching-roller 70, as illustrated in Fig. 9, whereby the loop is practically closed. At this moment the elbow-lever in passing out of the angular part $d$ of the cam-groove carries the rolling-table back again to its normal position, and at the same time the stud or pin 77, acting upon the arm 78 of the frame 68, propels the said frame forward, so that the roller 70 travels with the rolling-table to the normal position of said table, and the pocket in the bunching-apron is thereby contracted and the tobacco pressed. When the rolling-table has reached the limit of its movement, it stops. The roller, however, passes onward and outward over the rolling-table, the bunch being meanwhile rolled in the binder in the loop of the apron, as shown in Fig. 10. When the roller passes beyond the rolling-table, the wrapped bunch is deposited upon the hooks 65 or other receptacle placed there to receive it. As soon as the outward throw of the roller 70 is completed, the frame 68 is released and the weight 69 draws the roller back to its normal position, as shown in dotted lines, Fig. 11. At this time the elbow-lever 75 of the rolling-table enters the portion $d'$ of the cam-groove and the rolling-table is carried outward again, as shown in Fig. 11, tightening the apron, and as the elbow-lever passes out of this portion $d'$ of the cam the table is carried back again to its normal position, forming the loop or pocket. (Shown in Figs. 4 and 6.) As soon as the head D reaches its first position the feeding devices are acted upon by the upper shaft and the tobacco is fed into the chamber of the head. It will be understood that the shape of the forming-plate 56 may be varied according to the contour of the bunch or cigar to be made.

Having thus described our invention, we claim as new and desire to secure by Letters Patent—

1. In a cigar-bunching machine, the combination, with the frame thereof and a horizontally-reciprocating rolling-table having an unbroken face, of an apron secured at the outer end of the table, extending across the top thereof, and having its opposite end attached to the frame, and a reciprocating bunching-roller located beneath the apron and above the table and reciprocating beyond the ends of the latter, substantially as described.

2. In a cigar-bunching machine, the combination, with the frame thereof, a horizontally-reciprocating table having an unbroken surface, and an apron secured at one end to the table and at its other end to the frame, and having a pocket formed therein between the table and the frame, of a reciprocating bunching-roller located beneath the apron and above the table and having a movement beyond the ends of the latter, and means, substantially as described, for reciprocating the table and bunching-roller and returning the bunching-roller after forming the bunch and before the completed outward movement of the table, substantially as shown and described.

3. In a cigar-bunching machine, the combination, with a horizontally-reciprocating rolling-table, a flexible apron secured to the outer end of said table and to the machine-frame, having an open pocket formed near the inner end of the table, and a horizontally-reciprocating bunching-roller located beneath the apron, of a vertically-reciprocating forming-head held above the pocket and provided with a cutter and a forming-plate secured to the head and extending below the same, and gates hinged to the machine-frame and adapted to close the bottom of the head, all combined for operation substantially as and for the purpose specified.

4. In a cigar-bunching machine, the combination, with a horizontally-reciprocating rolling-table, a flexible apron secured to the said table and the machine-frame having a transverse open pocket produced normally therein between the frame and the table, and a bunching-roller capable of horizontal reciprocation beneath the apron and over the table, of a vertically-reciprocating forming-head above the pocket and provided with a cutter and a forming-plate secured to and extending below the outer face of the head, spring-pressed gates hinged to the machine-frame and covering the bottom of the forming-head, and means, substantially as shown and described, for imparting a stop movement to the bunching-roller and table upon their outward movement, as and for the purpose specified.

5. In a cigar-bunching machine, the combination of a reciprocating rolling-table, a flexible rolling-apron secured to the said table and to the frame of the machine, slackened to form a pocket between the machine-frame and the table, a reciprocating bunching-roller contacting with the said apron, a vertically-reciprocating forming-head for delivering the tobacco to the apron-pocket in the shape of a bunch, and endless belts arranged at a right angle to the cutter-head and capable of feeding material thereto, substantially as described.

6. In a cigar-bunching machine, the combination, with a horizontally-reciprocating rolling-table, a flexible rolling-apron secured to the said table and the frame of the machine, slackened to form a pocket between the machine-frame and the table, and a horizontally-reciprocating bunching-roller located between the apron and the opposed face of the table, of a forming-head adapted to vertically reciprocate over the apron-pocket and prothe mutilated gear 45. To the toothed bar 57 one end of a rope or chain 58 is secured, which rope passes upward through an offset upon the yoke-frame 21, over a pulley 58ª, and has its other end connected to the lever-bar 48, which is secured to the shaft 40.

In operation, as the upper drive-shaft 43 revolves, the mutilated gear 45, engaging with the toothed bar 57, forces the head D downward, and upon the head assuming its farthest downward position the cam 46 acts upon the lever-arm 48, throwing it rearward, thereby again raising the head. When the head D has assumed its upper or normal position, the crank-arm 44 of the upper drive-shaft 43 will have acted upon the angled lever 42 to set the carrying-aprons in motion, and sufficient tobacco will be forced in contact with the forming-plate 56 of the head to make a bunch capable of being wrapped in a binder. Upon the next downward movement of the head the tobacco contained therein is severed from the bulk.

In order to retain the tobacco in the head until it is desired to deliver the same therefrom, two gates 59 and 60 are hinged together, one of said gates 59 being hinged to the frame beneath the fixed knife 52, and the said gates are held normally, one beneath the head and in contact therewith and the other against the outer face of the head, by means of a spring 61, coiled around the hinging spindle or pintle of the gates, the ends of which spring bear upon the outer face of each gate, as shown in Figs. 6 and 7. Thus a chamber inclosed upon three sides is formed in the head. As tobacco is always contained in the space intervening the plate and the fixed knife, we secure to the inner face of the frame in which the head slides an angle-plate 61ª, which plate prevents the tobacco from being carried upward with the head.

From the center of the bed 15, at the forward end, spaced longitudinal guideways 62 are projected outward, as shown in Figs. 2 and 9, upon which a rolling-board 63, having a smooth upper face, is held to slide horizontally.

Upon the forward end of the bed 15 one extremity of a bunching-apron 64, preferably of rubber, is attached, the attachment being preferably detachable. The other end of this bunching-apron is secured in any approved manner to the outer end of the rolling-table 63, and the said apron and table are ordinarily made of the same width. Upon the outer end of the rolling-table hooks 65 or equivalent devices are secured to receive the products of the machine.

The bed of the machine is preferably made to extend outward a short distance at each side of the rolling-table, as shown in Fig. 5, and upon each extension of the bed a slotted guideway 66 is fastened, in each of which guideways (illustrated in detail in Figs. 13 and 14) a vertical standard 67 is held to travel. In these standards 67 a bunching-roller 70 is journaled, around which the bunching-apron 64 passes. A rectangular horizontal skeleton frame 68, preferably guided in suitable ways beneath the bed, has its forward end connected to the journals of the roller 70, and to the rear end of the said frame a weight 69 is attached by a suitable cord or chain, as shown in Figs. 1 and 3, whereby the frame is normally drawn such a distance rearward that the standards 67 and roller 70 will be located near the forward end of the body of the bed 15.

In the forward portion of the standards 16 of the machine the lower drive-shaft 71 is journaled. This shaft is connected with the upper drive-shaft 43 by a belt 72, the belt being usually a chain belt passing over sprocket-wheels secured to both drive-shafts, as shown in Figs. 1 and 2. Upon the lower drive-shaft a disk or solid wheel 73 is secured, having a cam-groove 74 produced in one face, the grooves being irregular at two opposite points $d$ and $d'$, only as shown in Fig. 4. The rolling-table is operated from this cam-faced disk by an elbow-lever 75, fulcrumed upon a stud 75ª, projected from the standard, as shown in Figs. 1 and 2, one member of which arm is bifurcated to engage with a pin secured in a recess in the rolling-table 63, the other being provided with a friction-roller adapted to travel in the cam-groove 74, as illustrated in Fig. 4 and in dotted lines in Figs. 9 and 11.

A spur-wheel 76, secured upon the lower drive-shaft 71, is provided with a pin 77, projected from one side, capable of engaging at intervals with an arm 78, integral with the skeleton frame 68, which is connected to the bunching-roller, as previously described. By this means the said roller is intermittingly moved forward. A crank-shaft 79 is usually journaled beneath the lower drive-shaft, carrying a pinion 80, which meshes with the spur-wheel 76, the said crank-shaft being usually driven by a pedal 81 and pitman 82; but other power may be applied to the lower drive-shaft, if desired. The crank-shaft 79 is provided at one end with a balance-wheel 83, adapted for contact with a brake 84, fulcrumed upon the standards of the machine, as shown in Figs. 2 and 3, whereby the crank-shaft can be revolved in one direction only.

In operation the first position is that illustrated in Figs. 4 and 6, in which the tobacco has been fed into the chamber of the head, the gates closing said chamber at the bottom, and an open pocket 85 is formed in the rolling-apron 64. Before the head is carried downward a binder 86 is placed in the pocket, and a portion thereof is made to rest upon the apron resting upon the rolling-table. As the upper drive-shaft is manipulated, the head is carried downward to deposit its contents in the shape of a bunch upon the binder in the pocket. As the head passes down, the gates gradually approach a perpendicular position, until when the third position is reached vided with a cutter and a forming-plate, spring-actuated connected gates, one of which is adapted to cover the bottom of the head and the other for contact with the forming-plate, and endless belts arranged at a right angle to the cutter-head and capable of feeding material thereto, as set forth.

7. In a cigar-bunching machine, the combination, with a horizontally-reciprocating rolling-table, a flexible rolling-apron secured to the said table and the frame of the machine, slackened to form a pocket beyond one end of the table, and a horizontally-reciprocating bunching-roller located beneath the apron in contact therewith, of a forming-head held to vertically reciprocate over the apron-pocket and provided with a cutter and a forming-plate, spring-actuated gates, one of which is adapted to cover the bottom of the head and the other for contact with the outer face of the forming-plate, a lower carrying-belt provided with adjustable guides arranged at a right angle to the cutter-head, an upper carrying-belt immediately above and arranged at a right angle to the lower belt, and means, substantially as described, for manipulating the said belts, as and for the purpose specified.

8. In a cigar-bunching machine, the combination, with a supporting-frame, of a sliding rolling-table, an apron secured to the table and frame, a sliding frame, a bunching-roller mounted in the sliding frame under the apron, and means for reciprocating the table and frame, substantially as described.

9. In a cigar-bunching machine, the combination, with a supporting-frame, of a sliding rolling-table, an apron secured to the frame and table, a sliding frame, a bunching-roller mounted in the sliding frame under the apron, means for moving the table first inward and then outward, and means for moving the sliding frame outward simultaneously with the table to the limit of its movement and then beyond the same, substantially as and for the purpose set forth.

10. In a cigar-bunching machine, the combination of a vertically-reciprocating forming-head provided with a cutter, a forming-plate and gates at its lower end, endless belts for feeding the tobacco to the said head, a reciprocating rolling-table, an apron secured to the table and to the supporting-frame, and a reciprocating bunching-roller, substantially as herein shown and described.

FRANCIS A. SCHLEIFF.
    FRANCIS A. SCHLEIFF, JR.
    PAUL EHMKE.

Witnesses:
  J. F. ACKER, Jr.,
  C. SEDGWICK.